June 28, 1927.
G. F. ENDICOTT ET AL
1,633,852
BEARING FOR RAILWAY AXLE JOURNALS
Filed Nov. 19, 1924
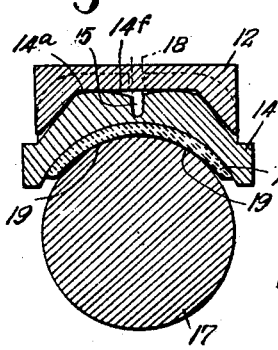
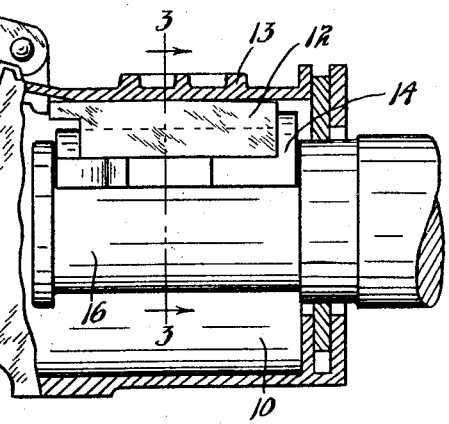
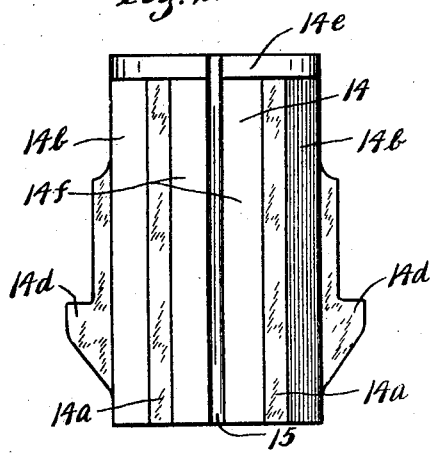
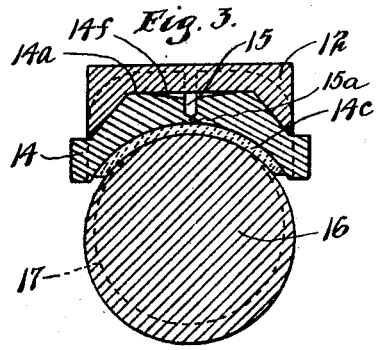
INVENTORS.
GEORGE F. ENDICOTT.
GEORGE H. GOODELL.
BY THEIR ATTORNEY.

Patented June 28, 1927.

1,633,852

UNITED STATES PATENT OFFICE.

GEORGE F. ENDICOTT AND GEORGE H. GOODELL, OF ST. PAUL, MINNESOTA.

BEARING FOR RAILWAY-AXLE JOURNALS.

Application filed November 19, 1924. Serial No. 750,773.

This invention relates to a journal bearing, and while the invention is applicable to various machines comprising journals, it is particularly designed for use with the axle journals of railway rolling stock such as freight and passenger cars, locomotive tenders, and the leading and trailing trucks of locomotives. In modern railway practice, the ends of the wheel axles of the railway trucks have journal portions formed thereon on which the journal bearings rest. The journal bearings are carried in journal boxes and carry the load of the truck frame and car. These bearings are of brass or similar material and are usually lined with babbitt or other anti-friction metal. It is necessary at intervals to replace the worn bearings with new bearings. Often when such replacement bearings are applied the axle journal is not of as large diameter as it was when new. It has been the common practice to place the replacement bearings on these worn axles with the bearing surface of cylindrical form and adapted to fit the journal when it was originally made or of the size it was when the axle was new. The worn journal therefore did not at once contact the entire surface of the worn bearing but only contacted the same at the central portion. Theoretically, there would be only one line of contact between the worn journal and the new bearing, which would be the element or line at the top of the cylindrical surfaces of the journal and bearing. In time, the bearing wears down to fit the worn journal. While this wearing down process is taking place, however, the bearing is very apt to run hot and injure the bearing or journal.

It is an object of this invention, therefore, to provide a bearing for such an axle journal or other journal which will contact the worn journal at a plurality of circumferentially spaced places or along circumferentially spaced lines.

It is a further object of the invention to provide a bearing comprising a plurality of sections constituting a bearing surface of cylindrical form, the said sections being held together in such a way that when placed on the worn axle journal and the load applied thereto, the said sections will be moved relatively to each other and the bearing surface of each brought into contact with circumferentially spaced portions of the axle journal, thereby a large bearing surface or area of contact is obtained so that the bearing is not apt to run hot while the same is being worn down to suit the worn journal.

It is a further object of the invention to provide such a bearing formed of a plurality of sections so connected as to be flexible under load and adapted to move relatively to each other and contact the axle journal at spaced elements when placed thereon under load.

These and other objects and advantages of the invention will be fully set forth in the following description made in connection with the accompanying drawings in which like reference characters refer to the same parts throughout the different views and in which, Fig. 1 is a view for the most part in vertical section through a journal box showing the bearing therein, a portion of said view being shown in side elevation;

Fig. 2 is a top plan view of a bearing made in accordance with this invention;

Fig. 3 is a view in vertical section taken on the line 3—3 of Fig. 1, showing the bearing of Fig. 2 in position;

Fig. 4 is a vertical section similar to Fig. 3 illustrating the bearing when placed in position under load.

Referring to the drawings, in Fig. 1 is shown a journal box of the type used in modern railway practice, of which it will only be necessary to consider the box body 10 shown as having the usual front hinged lid 11 and the wedge 12 which is disposed under the top or roof 13 of the journal box. The wedge 12 carries the load on the axle and rests on the bearing 14. As shown in Fig. 3, the wedge 12 has a flat under surface bearing on the top of the bearing 14 and also has diverging inclined surfaces substantially contacting the inclined surfaces 14$^b$ of the bearing 14. The parts so far described, except the structure of the bearing 14, are common and well known parts.

The bearing 14 is provided with a cylindrical bearing surface shown as formed of anti-friction metal 14$^c$ such as Babbitt metal and the said bearing surface is in the form of a segment of a cylinder, which cylinder is of substantially the same size as the axle journal when the same is new. The bearing 14 comprises, in effect, a plurality of sections shown as segmental in form, and while different numbers of sections might be used, in the embodiment of the invention illustrated, the bearing is shown as formed of two sections disposed at each side of a groove 15, which groove extends to within a very short distance of the top of the anti-friction metal 14ᶜ, the portion of metal 15ᵃ under said groove forming a connecting or retaining means for said sections. The top of bearing 14 has flat horizontal high surfaces 14ᵃ remote from the longitudinal center line of the bearing and adapted initially to receive the load from the wedge 12. From each surface 14ᵃ, a flat inclined surface 14ᶠ extends downwardly and inwardly toward the groove 15. The bearing 14 is provided with projecting lugs 14ᵈ and an upstanding end flange 14ᵉ which operate with other parts on the journal box and journal to hold the bearing in position longitudinally.

The bearing of the present invention is intended particularly for replacement work, that is, to be used in replacing the bearings on worn journals, as well as for application on new equipment. In Fig. 3, the axle journal 16 is shown in section, said journal being shown as of the size of a new journal. With such a new or full sized journal it will be seen that the bearing surface of bearing 14 contacts the same at substantially all points. A worn journal is indicated by the dotted line 17 and said dotted line represents the size of a journal which is worn to within $\frac{1}{16}$th of an inch of the point of condemnation. It will be readily seen from Fig. 3 that if the bearing 14 be placed on such a worn journal it will only contact therewith along the top portion of said journal. This produces a concentrated local pressure of high intensity between the bearing and journal. When a bearing is so placed the same is very apt to become hot before the bearing surface wears down to fit the journal. With such a bearing as shown in Fig. 3, when the same is so placed on the worn journal and the load applied to the wedge 12, the load is applied to each of the surfaces 14ᵃ and produces a bending moment about the longitudinal central part of the bearing causing the two sections thereof at each side of the groove 15 to move relatively to each other or to swing downward about a central longitudinal axis. This action and the position of the bearing when so moved under load is illustrated somewhat in exaggerated form in Fig. 4, in which the worn axle 17 is shown in section. In said figure it will be seen that the vertical walls of the groove 15, as seen in Fig. 3, will be moved to inclined position, as indicated by dotted lines 18 in Fig. 4. When the sections of the bearing thus move downwardly the bearing surfaces 14ᵃ also move downwardly. The load is thus largely transferred to surfaces 14ᶠ, as shown in Fig. 4. The bearing surface of the bearing has thus been distorted and instead of theoretically bearing along the top element of the journal, the same bears on the journal at separated lines designated as 19 in Fig. 4. In practice, of course, the contact between the bearing and the journal will be of some width. A much greater area of contact is thus obtained between the bearing and the worn journal and the load is more evenly distributed over the surface of the journal. The bearing will thus not run hot while the same is wearing down to a complete contact with the journal. The portion of metal 15ᵃ below groove 15 constitutes a connecting or retaining means for the sections of the bearing which is flexible under load. A bearing comprising a plurality of sections and one which is flexible under load is thus provided.

The parts of the improved bearing, if not united by some suitable arrangement for holding them together, may be applied to the journal in succession, one at a time, and when thus applied the journal bearing wedge, which is a standardized device universally used, may be relied upon to hold the parts in place and together when the load is resting on the journal. However, in case it is considered easier to apply the parts of the improved bearing simultaneously as a unit, the parts may be held together by strips or sections of brass, Babbitt or other suitable metal or material pressed or cast into spaces, grooves or pockets provided in the separate parts or fitted into and secured in a suitable back or shell made preferably of metal.

From the above description it is thus seen that applicant has provided a very simple and efficient bearing structure for the axle journals of railway rolling stock or other similar journals. The bearing, in effect, is composed of a plurality of segmental sections, held together in such a manner that they swing or move relatively to each other under load, thus forming a bearing flexible under load. The bearing is quite easily made and at substantially no more expense than the standard bearings of the prior art. The bearings are easily placed in position in replacement work and are in every way as convenient to handle as the standard bearings hitherto used.

It will, of course, be understood, that various changes may be made in the form, details, arrangement and proportions of the parts without departing from the scope of applicants' invention, which, generally stated, consists in a device capable of carrying out the objects set forth, in the novel parts and combinations of parts shown and described and defined in the appended claims.

What is claimed is:

1. A bearing for a railway journal comprising a member having a continuous semi-cylindrical surface adapted to engage the anti-friction metal next to the journal, said member having a longitudinal groove formed in its top portion dividing said member substantially into segments having a connecting portion of small cross section, said semi-cylindrical surface being formed to fit a full sized axle journal and said member having laterally spaced relatively high portions adapted to carry the load on said journal whereby when said journal wears said connecting portion will be distorted under load and said sections will conform approximately to the worn journal.

2. A bearing adapted to conform to the contour of a worn railway journal comprising a member extending over a portion of the journal and having a comparatively narrow groove at its outer side extending longitudinally thereof, said groove dividing said member into segmental sections having a connecting portion of small cross section therebetween, said bearing having a cylindrical surface adapted to fit a full sized new journal whereby it would contact the worn journal only along one line, said member having spaced high portions at its outer side at each side of said groove, and a load-carrying member bearing on said high portions, said connecting portion being adapted to be distorted under load when said member is placed on the worn journal, whereby said sections will move downwardly about a line extending centrally and longitudinally thereof and contact said worn journal along circumferentially spaced lines or surfaces.

In testimony whereof we affix our signatures.

GEORGE F. ENDICOTT.
GEORGE H. GOODELL.